March 5, 1946.  A. VENDITTY ET AL  2,396,137
PRELOADED JOINT ASSEMBLY
Filed Jan. 5, 1944
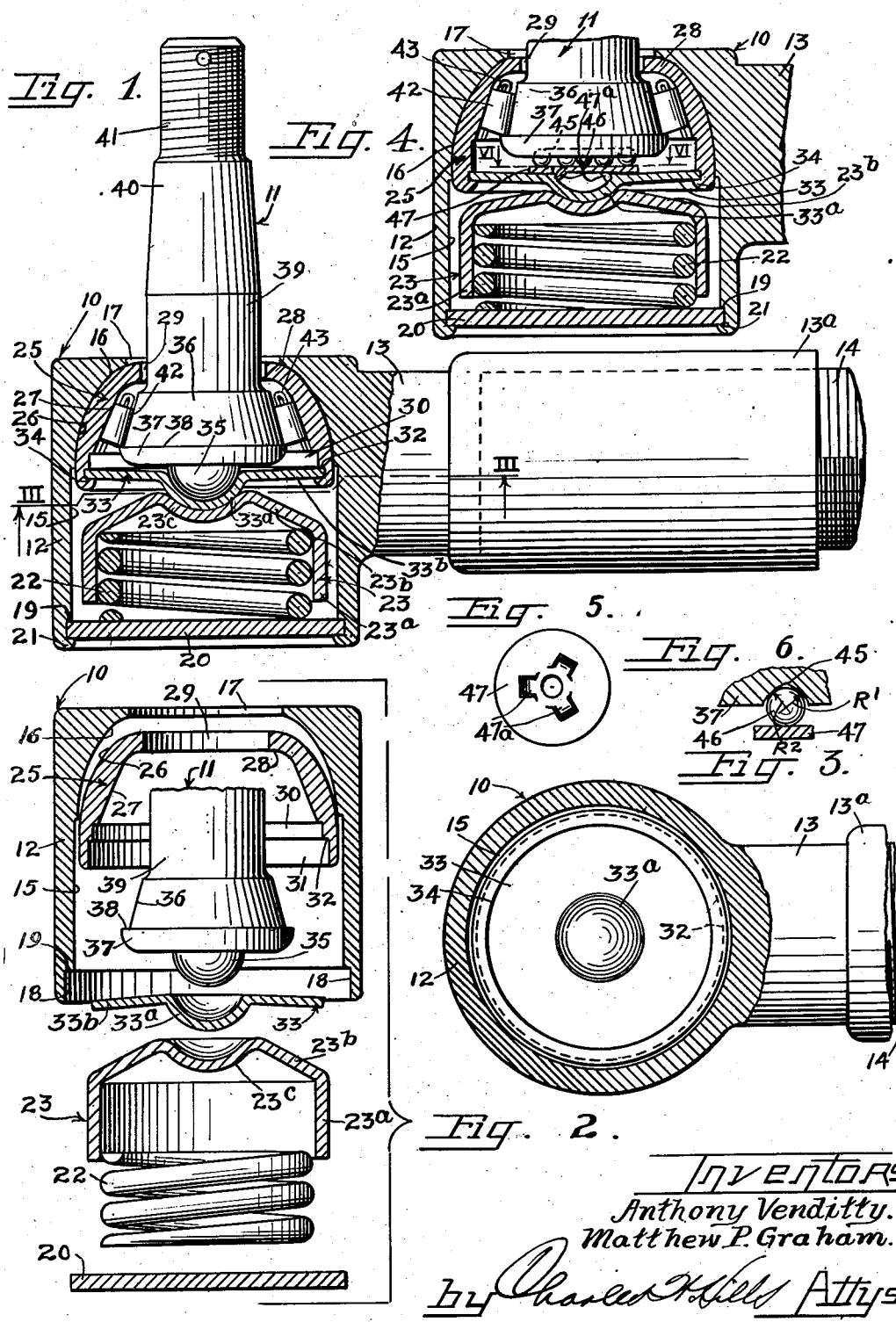
Inventors
Anthony Venditty.
Matthew P. Graham.

Patented Mar. 5, 1946

2,396,137

UNITED STATES PATENT OFFICE 2,396,137

PRELOADED JOINT ASSEMBLY

Anthony Venditty and Matthew P. Graham, Detroit, Mich., assignors to Thompson Products, Inc., Cleveland, Ohio, a corporation of Ohio Application January 5, 1944, Serial No. 517,020

12 Claims. (Cl. 287—90)

This invention relates to joint constructions wherein a joint member is rotatably mounted on anti-friction bearings and held in a tiltable bearing under spring load independent of the load on the tiltable bearing.

Specifically, the invention relates to tie rod joints having studs rotatably mounted about their own axes on roller bearings and tiltably mounted in all planes on plain bearings wherein the roller bearings are held in operative position by plain bearing member-carried springs which act on the studs and cooperate to provide a preloaded sub-assembly of roller bearing, ball stud, and plain bearing.

In accordance with this invention, which will be hereinafter specifically described as embodied in a tie rod joint although it is useful in all types of joints, a socket member or housing receives a seat member in tiltable relation therein, and the seat member, in turn, receives a stud therethrough. The stud has a head portion providing an inner race for a ring of anti-friction bearings such as roller bearings. The seat member has an inner surface providing an outer race for the bearings. A diaphragm spring is carried by the seat member and acts on the stud to urge the stud in a direction for placing a load on the anti-friction bearing. A second spring disposed in the socket acts on a slidable cup member to urge the same against the diaphragm spring for holding the tilting bearing or seat member in tiltable relation on the socket bearing wall.

Thus, a first spring places a predetermined load on the anti-friction bearings which carry a stud for rotation about its own axis, while a second spring places an independent load on the bearing or seat member which tiltably supports the stud. As a result, a preloaded assembly composed of stud, seat member, anti-friction bearing, and diaphragm spring is provided for ready mounting as a sub-assembly in the socket. The sub-assembly can be lubricated and ready for use. The anti-friction bearing can be subjected to any desired load as determined by the loading of the diaphragm spring. Thus the stud can be backed up with a very stiff spring tending to maintain the stud head in continual contact with the anti-friction bearings while the seat member or plain bearing can be backed up by a light spring load independent of the load on the anti-friction bearing. A better load distribution and maintenance of bearing contact without objectionable high friction can be obtained in the joints of this invention.

In one embodiment of the invention the stud has a rounded button end riding in a rounded depression of the diaphragm spring. In another embodiment of the invention the stud has a groove in the end face thereof receiving ball bearings which ride on the diaphragm spring or a member carried by the spring for decreasing resistance to rotative movements between the stud and diaphragm spring.

It is, then, an object of the invention to provide a joint assembly including a first set of bearings subjected to a first spring load, and a second set of bearings subjected to a second spring load but cooperating with the first set of bearings to provide for the universal mounting of a joint member.

A further object of the invention is to provide a universal joint assembly wherein rotative movements of the joint members are borne by anti-friction bearings maintained under predetermined load and wherein tilting movements are borne on plain bearings maintained under different predetermined load.

Another object of the invention is to provide a universal joint assembly wherein rotative movements are borne by one set of bearing surfaces subjected to high spring load while tilting movements are borne by a second set of bearing surfaces subjected to lower spring load.

A still further object of the invention is to provide a sub-assembly for a tie rod joint which is composed of a stud, an anti-friction bearing, a seat member, and a spring carried by the seat member and acting on the stud to place a predetermined load on the bearing.

A still further object of the invention is to provide a tie rod joint wherein a stud is urged into a seat by a seat carried spring and the seat is urged into a housing by a second spring.

A still further object of the invention is to provide a universal joint assembly wherein converging pairs of bearing surfaces respectively supporting rotative movements and tilting movements of the joint members are subjected to different and independent spring loads.

Other and further objects of the invention will be apparent to those skilled in the art from the following detailed description of the annexed sheet of drawings which, by way of preferred examples only, illustrates two embodiments of the invention.

On the drawing:

Figure 1 is a side elevational view with parts in vertical cross section, of a tie rod joint according to this invention.

Figure 2 is an exploded vertical cross-sectional view with parts in elevation and broken away, of the tie rod joint of Figure 1, illustrating the manner in which the parts are assembled.

Figure 3 is a horizontal cross-sectional view, with parts in bottom plan view, taken along the line III—III of Figure 1.

Figure 4 is a fragmentary vertical cross-sectional view, with parts in elevation, of a modified tie rod joint construction of this invention.

Figure 5 is a plan view of a wear washer used in the modified construction of Figure 4.

Figure 6 is an enlarged fragmentary vertical cross-sectional view of the ball race in the modified joint of Figure 4.

As shown on the drawing:

In Figures 1 to 4 inclusive, the reference numeral 10 designates generally a socket or housing member of a tie rod joint while the reference numeral 11 designates generally a stud which is tiltably and rotatably mounted in the socket or housing and projects from the housing.

The housing 10 has a generally cylindrical end portion 12 with a laterally extending shank or stem 13 having an enlarged hollow end portion 13a receiving, in threaded relation therein, the end of a tie rod 14.

The portion 12 of the housing 10 has a cylindrical bore 15 extending from the bottom end of the housing to an inwardly converging segmental spherical bearing wall 16 near the upper end of the housing. The bearing wall 16 converges to a circular opening 17 of smaller diameter than the bore 15.

As best shown in Figure 2, the bore 15 of the housing portion 12 is counterbored at 18 for providing a shoulder 19 inwardly from the bottom end of the housing portion. A closure disk 20 fits in the counterbore 18 against the shoulder 19 and the bottom end of the housing 12 is peened or spun over the peripheral part of the closure disk 20 as at 21 in Figures 1 and 4 to secure the closure disk in position in the housing.

A coiled spring 22 is mounted in the bore 15 and is bottomed on the closure disk 20. This spring 22 is encased by a cup-shaped retainer 23 having a cylindrical side wall 23a receiving the spring 22 therein and spaced from the bore 15 together with a tapered or conical top wall 23b receiving the top end coil of the spring 22 thereagainst and a fragmental spherical central top wall portion 23c at the apex end of the conical portion 23b providing a rounded dimple or seat for a purpose to be more fully hereinafter described.

A hollow seat or bearing ring 25 is disposed in the housing portion 12 and has a fragmental spherical external bearing wall 26 tiltably seated on the bearing wall 16 of the housing together with a frusto-conical inner wall 27 for a purpose to be more fully described. The spherical wall 26 and conical wall 27 converge in the same general direction to an apertured top wall 28 having a central aperture 29 therethrough.

The seat member 25 has a cylindrical bore 30 in the bottom end thereof together with a cylindrical counterbore 31 providing a shoulder 32 at the inner end thereof.

A spring metal disk 33 fits within the counterbore 31 and is bottomed on the shoulder 32. Metal of the seat member at the outer end of the counterbore 31 is peened or spun over the peripheral portion of the spring disk 33 as at 34 in Figures 1 and 4. The disk 33 is thus secured in the bottom of the seat member 25.

As shown in Figure 2, the spring disk 33 has a rounded hollow button portion 33a at the center thereof surrounded by a somewhat bowed radial flange 33b. The portion 33a is adapted to ride in the portion 23c of the cup member 23.

The stud 11 has a rounded button end 35 seated in the portion 33a of the spring disk 33, an enlarged conical head portion 36 with an annular base 37 providing a flat shoulder 38, a cylindrical portion 39 extending from the apex end of the conical head 36, a tapered portion 40, and an externally threaded cylindrical free end portion 41 continuing from the small end of the tapered portion 40.

As shown in Figure 1, a ring of tapered roller bearings 42 is disposed around the conical head 36 of the stud and bottomed on the shoulder 38 of the stud. The stud head 36 provides an inner race for the roller bearings 42 while the conical wall 27 of the seat member 25 provides an outer race for the roller bearings. A cage 43 holds the roller bearings 42 in spaced relation around the stud head.

The button end 35 of the stud is seated in the depression 33a of the spring 33 and, as shown in Figure 1, the spring member is loaded by flexing the flange portion 33b thereof from the downwardly sloping or bowed position shown in Figure 2 to the upwardly sloping or bowed position shown in Figure 1. The spring 33 thus urges the stud upwardly in the seat member 25 and, since the conical head 36 of the stud and the conical wall 27 of the stud converge in an upward direction, the roller bearings 42 are subjected to radial loads because they are bottomed on the shoulder 38 of the stud and must move upwardly with the stud.

The cylindrical portion 39 of the stud fits freely through the opening 29 of the seat member so the stud will rotate freely on the anti-friction roller bearings 42 in the seat member 25. The button end 35 of the stud will rotate within the depression 33a of the spring.

A spring-loaded sub-assembly of stud, seat member, and anti-friction element is thus provided and the spring load on the anti-friction element can be controlled as desired by selection of spring disks 33 or by control of the degree of flexing of these disks through variation of the depth of the counterbore 31 in the seat member 25.

The spring load provided on the anti-friction bearing by the spring 33 is preferably maintained quite high so that the anti-friction bearings will always ride on the inner and outer conical races provided by the stud head and by the seat member respectively. The stud will thus rotate about its own axis in the seat member 25 on the anti-friction bearings 42.

The cup retainer 23 acts on the portion 33a of the spring member 33 to urge the seat member 25 into tilting bearing relation on the housing bearing wall 16. The spring load on the cup member 23 is preferably much lighter than the load on the anti-friction member so that the spring load on the plain bearing surfaces accommodating tilting movements is lighter than the load on the anti-friction bearings accommodating rotating movements of the stud.

The relative loads on the respective bearing surfaces, however, can be varied as desired.

In the species of Figures 1 to 3 the button end 35 of the stud rides in the depression 33a of the spring member and thus plain bearing relationship between these parts is provided. In the modification shown in Figures 4 to 6, however, anti-friction bearing relation between the stud member and the spring member 33 is provided.

In Figures 4 to 6, parts identical with parts described in connection with Figures 1 to 3 have been marked with the same reference numerals. An annular ball race 45 is formed in the end face of the portion 37 of the stud 11 and the rounded button end 35 of the stud is eliminated. The ball race 45, as shown in Figure 6, is struck from two radii R₁ and R₂ slightly larger than the radius of the balls 46 which are seated in the groove. This provides for a two-point contact between each ball 46 and the race 45.

As shown in Figures 4 and 5, a wear washer 47 is mounted on the spring 33 to provide a bottom race for the balls 46. This wear washer can have three tongues 47a struck downwardly therefrom into the dimple 33a of the spring 33 so that the washer 47 will be held on the central portion of the spring 33 in position for bottoming the balls 46. Thus, as shown in Figure 6, the ball race and wear washer make a three-point contact with each ball 46.

The balls 46 decrease frictional resistance to turning movements between the stud 11 and the seat assembly 25 by providing anti-friction bearings between the spring 33 of the seat assembly and the stud head.

If desired, of course, the wear washer 47 can be eliminated and the balls 46 could be directly seated on the spring disk 33.

From the above descriptions it will be understood that the invention now provides a tie rod joint assembly wherein rotation of the stud about its own axis is borne on anti-friction bearings subjected to a high spring load, while tilting of the stud is borne on plain bearings subjected to a lighter spring load.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A joint construction comprising a socket member having an internal bearing wall accommodating tilting movements, a seat member tiltable on said bearing wall, a stud projecting through said seat member, anti-friction elements between said stud and seat member rotatably supporting the stud in the seat member, a spring carried by the seat member acting on the stud to load the anti-friction elements, and an additional spring-urged member acting on the spring to hold the seat member in tiltable bearing relation on the housing bearing wall.

2. A tie rod joint comprising a housing having an internal bearing wall accommodating tilting movements, a seat in said housing tiltable on said bearing wall, a stud projecting through said seat, a head on said stud converging in the same general direction as the bearing wall of the housing, a shoulder on said stud head, a ring of roller bearings disposed around said stud head bottomed on said shoulder, a spring carried by said seat acting on said stud to urge the roller bearing against said seat, and a second spring acting on the first mentioned spring holding the seat in bearing relation on the bearing wall of the housing.

3. A tie rod joint comprising a socket having an internal segmental spherical bearing wall, a seat member tiltable on said bearing wall, a stud projecting through said seat member, roller bearings between said stud and seat member rotatably supporting the seat member about its own axis, a spring disk carried by the seat member acting on the stud to provide to preloaded stud, bearing and seat assembly, and a second spring acting on the spring disk to urge the seat member against the bearing wall of the socket.

4. A tie rod joint construction comprising a housing, a joint stud having a frusto-conical head and a rounded end in said housing, a ring of roller bearings disposed around said frusto-conical head, a seat member disposed around said ring of roller bearings and providing an outer race for said roller bearings, a spring disk anchored in said seat member and having a rounded depression receiving the rounded end of the stud to act on the stud for loading the roller bearings, a spring retainer rockably receiving said spring member, and a coil spring disposed in said housing acting on said spring retainer to urge the seat member into bearing relation with the housing.

5. In a joint construction, a preloaded subassembly comprising a stud having a head portion, a seat member loosely disposed around said stud, anti-friction bearings between the stud and seat member, and a spring disk carried by the seat member acting on the stud to load the anti-friction bearings.

6. A joint construction comprising a stud, anti-friction bearings disposed around the stud, a seat member disposed around said anti-friction bearings and providing an outer race for said bearings, means carried by the seat member urging the stud in a direction to load the anti-friction bearings, and a housing tiltably receiving said seat member.

7. A tie rod joint construction comprising a socket, a seat tiltably mounted in said socket, a stud projecting through said seat, roller bearings between said stud and seat rotatably mounting the stud in the seat, a spring disk anchored in the seat, ball bearings between the stud and spring disk urged by the spring disk to thrust on the stud for loading the roller bearings while rotatably bottoming the stud on the spring disk, and a spring-urged retainer rockably receiving said spring disk and urging the seat into bearing relation with the socket.

8. A tie rod joint construction comprising a joint socket, a seat tiltable in said socket, a stud projecting through said seat having a frusto-conical head in the seat, said seat having an internal bearing wall converging in the same direction as the frusto-conical head of the stud, roller bearings between the head of the stud and said bearing wall of the seat, a spring member carried by the seat acting on the stud to load said roller bearings, and a second spring member operatively interposed between the seat and socket for urging the seat into bearing relation with the socket bearing wall.

9. In a joint construction a stud and seat assembly comprising a stud having a head portion, a seat loosely disposed around said head portion of the stud, roller bearings interposed between the stud head and seat, said stud having an end face with a ball race therein, ball bearings in said race, and a spring member carried by said seat urging said ball bearings into said race for loading the roller bearings.

10. In a joint construction a stud having a head with an end wall containing an annular groove, a seat disposed around said head, a housing tiltably carrying the seat, roller bearings between said seat and head, a spring carried by said seat having a central hollow embossment providing a rounded projection, a washer mounted on said spring having tangs seated in the hollow embossment, ball bearings interposed between said washer and said groove, whereby the stud is rotatably supported in the seat on radial load carrying roller bearings and on thrust load carrying ball bearings, and a spring-urged retainer having a rounded depression receiving the projection of said spring in rockable relation to urge the seat into bearing relation with the housing.

11. A joint construction comprising first and second joint members having converging bearing surfaces in tiltable relation, a first spring acting on said joint members to urge the same in the direction of convergence of the bearing surfaces thereof, a third joint member in rotatable relation relative to the first and second joint members, and a second spring carried by the second joint member acting on said third member.

12. A joint construction comprising first and second joint members having bearing surfaces converging in the same general direction accommodating tilting movements of the joint members, a spring urging the second joint member in the direction of convergence of said bearing surfaces to maintain said bearing surfaces in bearing relation, a third joint member rotatable about its own axis relative to said first and second joint members, and a second spring carried by the second joint member acting on said third joint member.

ANTHONY VENDITTY.
MATTHEW P. GRAHAM.